March 9, 1926.
L. S. WALKER
1,576,383
PUMP PISTON SHIFTER
Filed Sept. 9, 1925
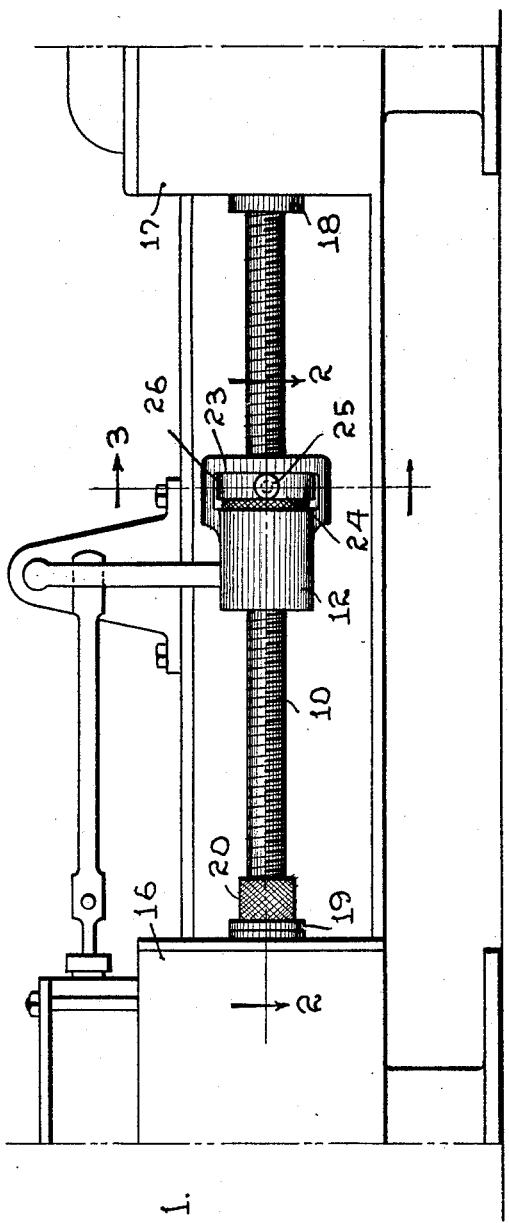
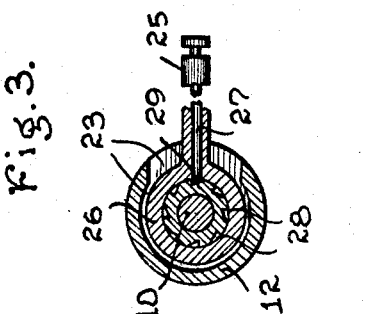
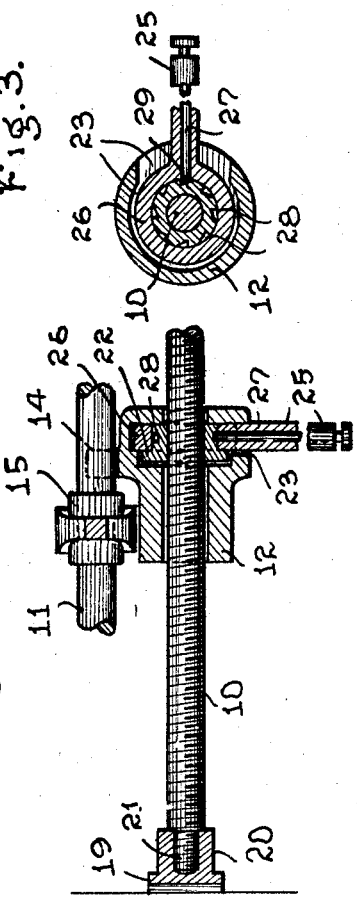
Inventor
LAMAR S. WALKER
By
Attorney Patented Mar. 9, 1926.

1,576,383

UNITED STATES PATENT OFFICE.

LAMAR S. WALKER, OF TAMPA, FLORIDA.

PUMP-PISTON SHIFTER.

Application filed September 9, 1925. Serial No. 55,413.

*To all whom it may concern:*

Be it known that LAMAR S. WALKER, a citizen of the United States of America, residing at Tampa, in the county of Hillsborough and State of Florida, has invented new and useful Improvements in Pump-Piston Shifters, of which the following is a specification.

The object of the invention is to provide a device of simple construction which may be easily applied to a pump for the purpose of shifting the piston rods from one end of the stroke to the other or to an intermediate position for the purpose of facilitating valve setting, packing, or repairs; to provide a device capable of functioning without danger of springing, bending or scarring the piston rod, or breaking or slipping the spool on the rod; and to provide a construction capable of operation where limited space only for working is available.

With this object in view, the invention consists in a construction and combination of parts of which a preferred embodiment is illustrated in the accompanying drawings, wherein:

Figure 1 is a side elevational view of a portion of a steam pump with the invention applied in operative position thereon.

Figure 2 is a detail sectional view on the plane indicated by the line 2—2 of Figure 1.

Figure 3 is a sectional view on the plane indicated by the line 3—3 of Figure 1.

The invention comprises a threaded rod 10 for disposition in parallelism with the piston rod 11; and a sleeve member 12 axially movable of the rod 10 and provided with a lateral forked abutment 14 for disposition in abutting relation with the spool 15 on the rod 11. The rod 10 is maintained in its position relative to the piston rod by abutting engagement with the facing end of a steam cylinder 16 and water cylinder 17, a fixed foot 18 being provided at one end of the rod and an adjustable foot 19 at the other end of the rod, the adjustable foot having a knurled collar 20 threadingly engaged with a reduced portion 21 of the rod 10. The disposition of the rod between the two cylinders and the rotation of the collar 20 serves to bring the two feet into firm contact with the two cylinders and this frictional engagement is sufficient to retain the rod in position.

The sleeve 12 is provided with a bore effecting a snug but sliding fit with the rod 10 and the means for effecting axial movement of the sleeve consists of a nut 22 threadingly engaged with the rod 10 but housed in a slot 23 in the sleeve, the nut having a peripherally knurled flange 24 for finger actuation to provide for relatively quick movement of the sleeve until the fork 14 is brought into abutting engagement with the spool 15, the bifurcation in the fork permitting its straddling the piston rod 11. The slot 23 opens on the side of the sleeve diametrically opposite the fork 14 to provide an operating space for the nut actuating lever 25 which at its inner end is provided with an eye 26 surrounding the nut and in lateral contact with the flange 24.

Relative movement between the nut and eye is possible except when the spring actuated latch member 27 is engaged with one of the notches 28 in the nut, when the lever and nut must perforce move together when the lever is moved in one direction. The latch member is beveled on the under edge, as indicated at 29, to provide for a ratchet action when actuating the nut by means of the lever. When actuating the nut by the fingers on the knurled flange 24, the retraction of the latch is sufficient to free the lever from the nut.

Obviously, the device provides for the hand movement of the pistons and piston rod to position them at any desired point, the rod 10, when attached, being a fixed member with relation to the pump structure as a whole, so that any movement imparted to the sleeve with respect to the rod will effect movement of the piston rod with reference to the pump structure.

The device is easily attached, the sleeve being first set somewhere near the desired point on the rod, so as to be close to or in contact with the spool 15 when the rod is secured in place.

The invention having been described, what is claimed as new and useful is:

1. A device for the purpose indicated comprising an axially movable member provided with means for engaging the spool on the piston rod of a pump, and a guide element for said member for rigid mounting with respect to the pump, said guide element comprising a longitudinally extensible rod for abutting engagement with the facing ends of the steam and water cylinders of the pump.

2. A device for the purpose indicated comprising an axially movable member provided with means for engaging the spool on the piston rod of a pump, and a guide element for said member for rigid mounting with respect to the pump, said guide element consisting of a rod having terminal bearing feet for contact with the facing ends of the steam and water cylinders of the pump, one of said feet being adjustable axially of the rod.

3. A device for the purpose indicated comprising a guide member consisting of a rod provided with means for effecting bearing engagement with the facing ends of the steam and water cylinders of a pump to dispose it in parallelism with the piston rod, a second member mounted upon and axially movable on said guide member and provided with a lateral fork for straddling the piston rod to abut the spool thereon, and positive means for advancing the second member along the guide member.

4. A device for the purpose indicated comprising a guide member consisting of a rod provided with means for effecting bearing engagement with the facing ends of the steam and water cylinders of a pump to dispose it in parallelism with the piston rod, a second member mounted upon and axially movable on said guide member and provided with a lateral fork for straddling the piston rod to abut the spool thereon, and positive means for advancing the second member along the guide member, the guide member consisting of an exteriorly threaded rod and the second member comprising a sleeve slidably mounted on said rod and provided with an actuating nut in threaded engagement with the rod.

5. A device for the purpose indicated comprising a guide member consisting of a rod provided with means for effecting bearing engagement with the facing ends of the steam and water cylinders of a pump to dispose it in parallelism with the piston rod, a second member mounted upon and axially movable on said guide member and provided with a lateral fork for straddling the piston rod to abut the spool thereon, and positive means for advancing the second member along the guide member, the guide member consisting of an exteriorly threaded rod and the second member comprising a sleeve slidably mounted on said rod and provided with an actuating nut threadingly engaging the rod, said nut being movable angularly with respect to the sleeve but axially fixed with respect thereto.

6. A device for the purpose indicated comprising a guide member consisting of a rod provided with means for effecting bearing engagement with the facing ends of the steam and water cylinders of a pump to dispose it in parallelism with the piston rod, a second member mounted upon and axially movable of said guide member and provided with a lateral fork for straddling the piston rod to abut the spool thereon, and positive means for advancing the second member along the guide member, the guide member consisting of an exteriorly threaded rod and the second member comprising a sleeve slidably mounted on said rod and provided with an actuating nut threadingly engaging the rod, said nut being movable angularly with respect to the sleeve but axially fixed with respect thereto and having an actuating ratchet lever.

In testimony whereof he affixes his signature.

LAMAR S. WALKER.